US011978367B2

(12) United States Patent
Santarelli

(10) Patent No.: US 11,978,367 B2
(45) Date of Patent: May 7, 2024

(54) SUSTAINABLE A-FRAME DISPLAY

(71) Applicant: American Greetings Corporation, Cleveland, OH (US)

(72) Inventor: Anthony Santarelli, North Olmsted, OH (US)

(73) Assignee: American Greetings Corporation, Cleveland, OH (US)

( * ) Notice: Subject to any disclaimer, the term of this patent is extended or adjusted under 35 U.S.C. 154(b) by 249 days.

(21) Appl. No.: 17/516,854

(22) Filed: Nov. 2, 2021

(65) Prior Publication Data

US 2022/0139272 A1 May 5, 2022

Related U.S. Application Data

(60) Provisional application No. 63/109,428, filed on Nov. 4, 2020.

(51) Int. Cl.
*G09F 7/18* (2006.01)
*A47F 5/00* (2006.01)
*G09F 7/06* (2006.01)

(52) U.S. Cl.
CPC .............. *G09F 7/18* (2013.01); *A47F 5/0018* (2013.01); *G09F 7/06* (2013.01); *G09F 2007/1843* (2013.01)

(58) Field of Classification Search
CPC .......... A47F 7/145; A47F 5/0018; A47F 5/08; A47F 5/10; G09F 15/0062; G09F 7/18; G09F 7/06; G09F 2007/1843; G11B 33/0483; G11B 33/0461
See application file for complete search history.

(56) References Cited

U.S. PATENT DOCUMENTS

| | | | | | | |
|---|---|---|---|---|---|---|
| 2,002,128 | A | | 5/1935 | Reidenbaugh | | |
| 2,999,599 | A | * | 9/1961 | Jentzen | A47F 5/08 | 108/2 |
| 3,486,634 | A | * | 12/1969 | Frater | A47F 5/0025 | 211/128.1 |
| 3,492,772 | A | * | 2/1970 | Bergman | A47F 7/24 | 52/459 |
| 3,816,948 | A | * | 6/1974 | Mooney | G09F 1/14 | 40/388 |
| 3,830,374 | A | * | 8/1974 | Kassimir | A47F 5/103 | 211/1 |
| 4,460,097 | A | * | 7/1984 | Darnell, II | A47F 5/103 | 108/108 |
| 4,540,222 | A | * | 9/1985 | Burrell | A47F 3/00 | 211/186 |
| 4,651,872 | A | * | 3/1987 | Joyce | G11B 33/0433 | 206/45.24 |
| 4,905,845 | A | * | 3/1990 | Broeker | A47F 7/145 | 211/128.1 |

(Continued)

FOREIGN PATENT DOCUMENTS

WO 2008147996 12/2008

*Primary Examiner* — David R Dunn
*Assistant Examiner* — Christopher E Veraa
(74) *Attorney, Agent, or Firm* — Christine Flanagan

(57) ABSTRACT

A flexible, four-sided, a-frame display for merchandising greeting card and non-greeting card merchandise. The display is relatively small and can be used as an outpost display in smaller retail spaces. It can easily be set up, taken down and arranged with various merchandising assemblies. It also contains a hidden storage compartment.

7 Claims, 7 Drawing Sheets

(56) References Cited

U.S. PATENT DOCUMENTS 5,009,335 A * 4/1991 Jonker .................... A47F 7/145 D34/17
5,014,859 A * 5/1991 Johnson .................. A47F 7/146 211/128.1
5,078,283 A * 1/1992 Wilson .................... A47F 5/101 211/187
5,284,256 A * 2/1994 Correll-Antoun ..... A47B 63/00 211/198
6,029,833 A * 2/2000 Yeh .......................... A47F 7/19 211/187
6,112,918 A * 9/2000 Burgess ................. A47B 57/04 211/186
6,116,326 A * 9/2000 Domina ................ E04B 2/7422 160/351
6,427,857 B1 * 8/2002 Adams ...................... A47F 5/10 211/175
6,955,268 B2 * 10/2005 Waldron ............ G11B 33/0466 211/59.3
7,249,430 B2 * 7/2007 Kerker ...................... G09F 1/10 40/124.4
7,581,650 B1 * 9/2009 Shen ....................... A47F 7/145 211/55
7,703,225 B2 4/2010 Kerker et al.
7,900,784 B1 * 3/2011 Weigand ................. A47F 5/005 211/186
D673,390 S * 1/2013 Sparkowski ................ D6/678.4
8,579,127 B2 * 11/2013 Dyck ................... A47B 96/068 211/103
8,807,356 B2 * 8/2014 Weigand ................... A47F 5/10 211/183
8,919,579 B2 * 12/2014 Weigand ................. A47F 7/144 211/186
9,192,251 B1 * 11/2015 Theisen .................. A47F 5/103
D809,324 S * 2/2018 Robins ........................ D6/675.4
9,936,825 B1 * 4/2018 Lindblom ............. A47F 5/0087
10,037,659 B2 * 7/2018 Wise .................... G07G 1/0018
10,327,546 B2 * 6/2019 Kimball .................... A47F 5/02
D853,762 S * 7/2019 Tucker ........................... D6/672
10,869,561 B2 * 12/2020 Arradondo ............ A47F 5/0006
D914,410 S * 3/2021 Lo ............................... D6/675.3
11,263,934 B2 * 3/2022 Milne ..................... A47F 5/083
2002/0088765 A1 * 7/2002 Waldron ............ G11B 33/0483 211/40
2006/0011565 A1 * 1/2006 Pirro ....................... A47F 3/004 211/189
2006/0014132 A1 * 1/2006 Hamilton ............... G09B 5/067 434/365
2006/0134589 A1 * 6/2006 Goodwin ............... G09B 23/28 434/259
2011/0192812 A1 * 8/2011 Weigand ................... A47F 5/10 211/85.8
2012/0086316 A1 * 4/2012 Schaaf ................... A47B 81/00 312/265.5
2012/0260833 A1 * 10/2012 Taylor ...................... A47C 9/06 108/69
2019/0331288 A1 * 10/2019 Gupta .................. A47B 96/027
2020/0357314 A1 * 11/2020 Milne ....................... A47F 5/10
2022/0133062 A1 * 5/2022 Osiecki ................. A47F 5/0815 211/45
2022/0139272 A1 * 5/2022 Santarelli .................. A47F 5/08 40/606.01

* cited by examiner

SUSTAINABLE A-FRAME DISPLAY

RELATED APPLICATIONS

This application is a non-provisional of and claims priority to U.S. Provisional Patent Application No. 63/109,428, filed on Nov. 4, 2020, a copy of which is incorporated herein by reference in its entirety.

FIELD OF THE INVENTION

The invention is in the field of retail displays. More specifically, flexible retail outpost displays for social expression products such as greeting cards, gift wrap, gift package accessories, etc.

SUMMARY OF THE INVENTION

The a-frame merchandise display of the present disclosure and related inventions includes: two main frames, each frame having a front surface and a rear surface opposite the front surface; a vertical upper end; and a vertical lower end opposite the vertical upper end; a pegboard panel inserted into each of the two main frames; at least one frame lock which removably attaches the two main frames to one another proximate the vertical upper ends thereof; a bottom pan or tray which is inserted between the vertical lower ends of the two main frames; and two side frames which are attached between the two main frames, each of the two side panels having a pegboard panel inserted therein.

In another embodiment, the a-frame merchandise display includes: two main frames; a frame lock which connects the two main frames together along an upper end thereof; two side frames which are attached between the two main frames; a pegboard panel inserted between each of the two main frames and the two side frames; and one or more card tiers which are removably attached to the pegboard panels inserted between the two main frames.

In still another embodiment, the a-frame merchandise display includes: two main frames, each main frame having two long sides parallel to one another with a upper end and a lower end opposite the upper end; and two short sides, one short side attached between the upper ends of the long sides and the other short side attached between the lower ends of the long sides, creating a closed rectangular frame; a frame lock which is attached between an outer surface of each of the two long sides of the two main frames near the upper end thereof; two side frames attached between each of the a-shaped space created at the sides of the two attached main frames, creating a closed four-sided structure; and a pegboard panel attached to the inside surface of each of the two main frames and two side frames.

DETAILED DESCRIPTION OF PREFERRED AND ALTERNATE EMBODIMENTS

The present disclosure and related inventions are directed to a sustainable a-frame floor display (hereinafter referred to as “a-frame display”) for retail merchandising of both greeting card and non-greeting card merchandise such as, for example, gift wrap, stationery, stickers, gift package accessories, etc. The a-frame display is easily set up and taken down and has a relatively small footprint to accommodate smaller retailers or boutique shops or to minimize the space taken in larger retail store aisles. It also contains a hidden storage compartment for extra product or loose fixture accessories such as card tiers, hooks, and signs.

The a-frame display 100 may contain but is not limited to a main frame assembly 10, a a side frame assembly 14, a bottom pan 12 and one or more merchandise assemblies. The a-frame display 100 ships in three packages—the main frame assembly 10 (which folds down flat), the side frame assembly 14 and one or more merchandise assemblies.

Figure 4:
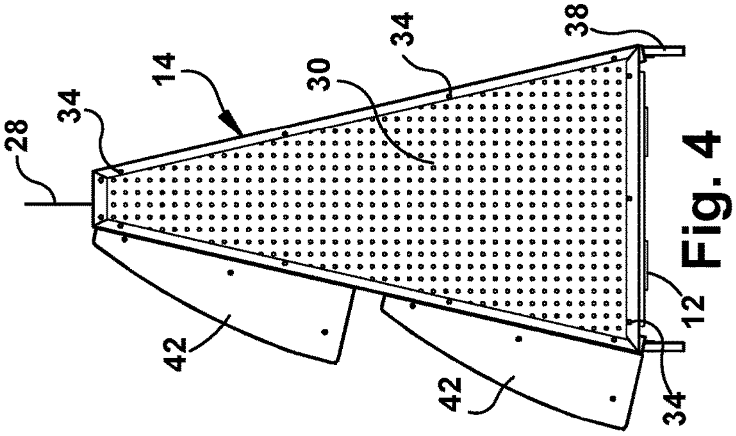
FIG. 4 is a right side view of FIG. 1.
Figure 2:
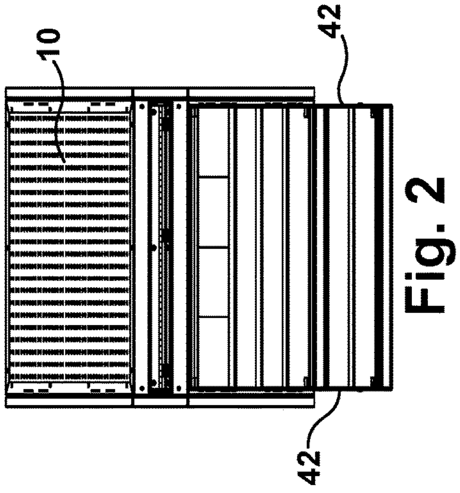
FIG. 2 is a top down view of FIG. 1.
Figure 3:
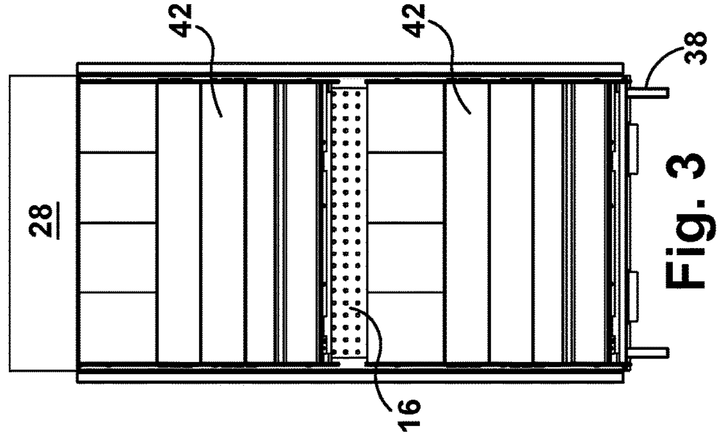
FIG. 3 is a front view of FIG. 1.
Figure 1:
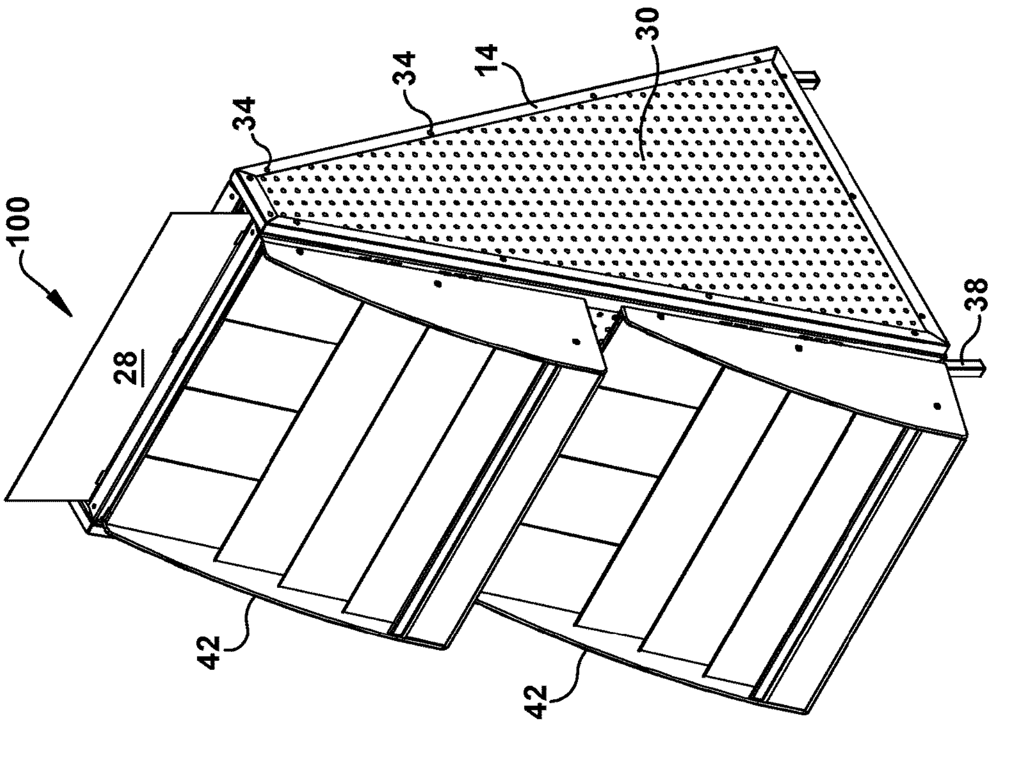
FIG. 1 is a perspective view of the a-frame merchandise display (with attached modules).
Figure 5:
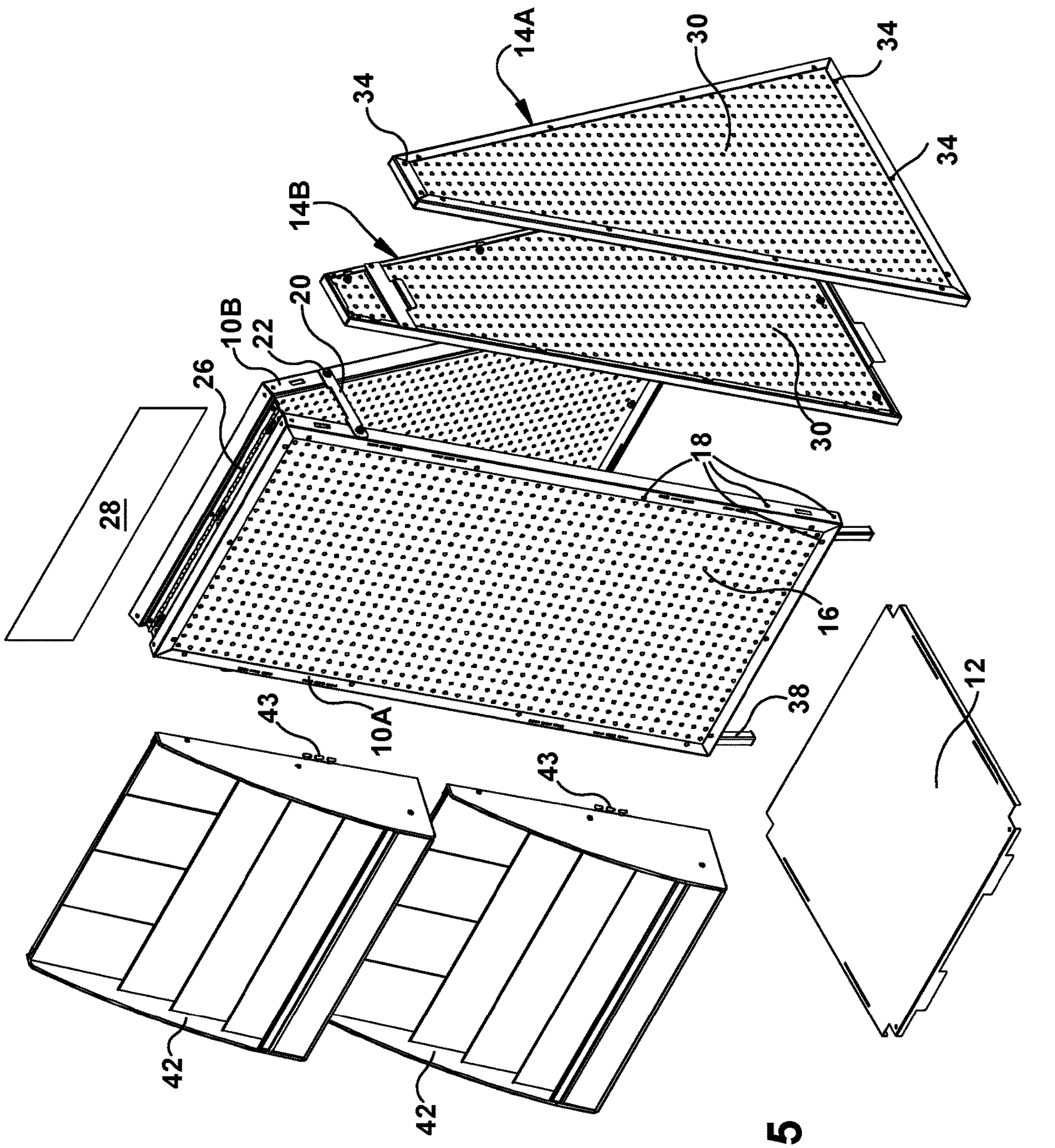
FIG. 5 is an exploded view of the a-frame merchandise display
Figure 10:
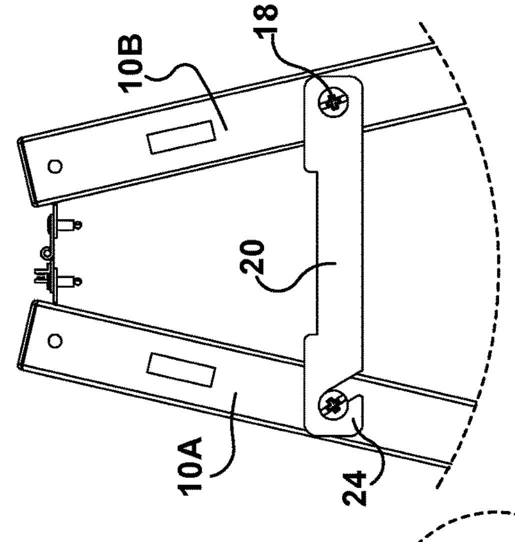
FIG. 10 is a close-up view of FIG. 9 showing the frame lock.
Figure 9:
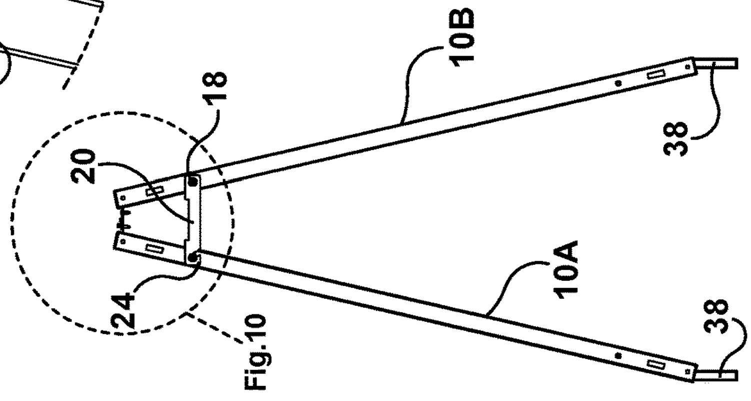
FIG. 9 is a right side view of FIG. 6.
Figure 7:
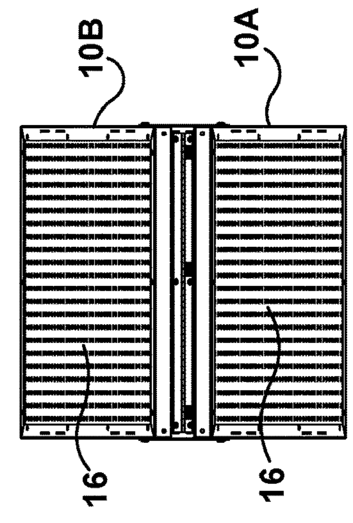
FIG. 7 is a top down view of FIG. 6.
Figure 8:
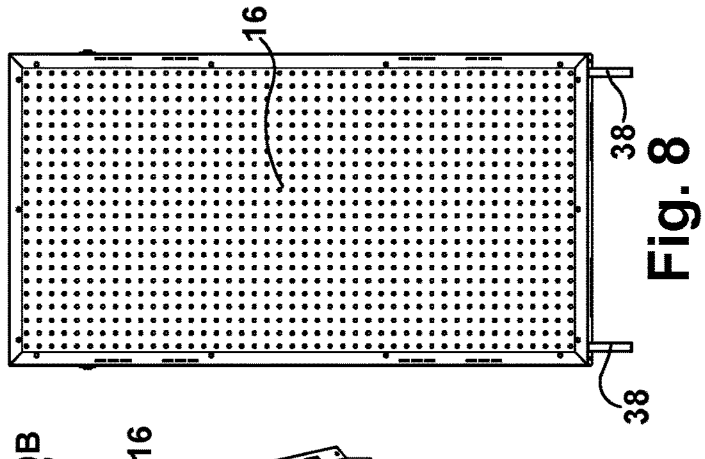
FIG. 8 is a front view of FIG. 6.
Figure 6:
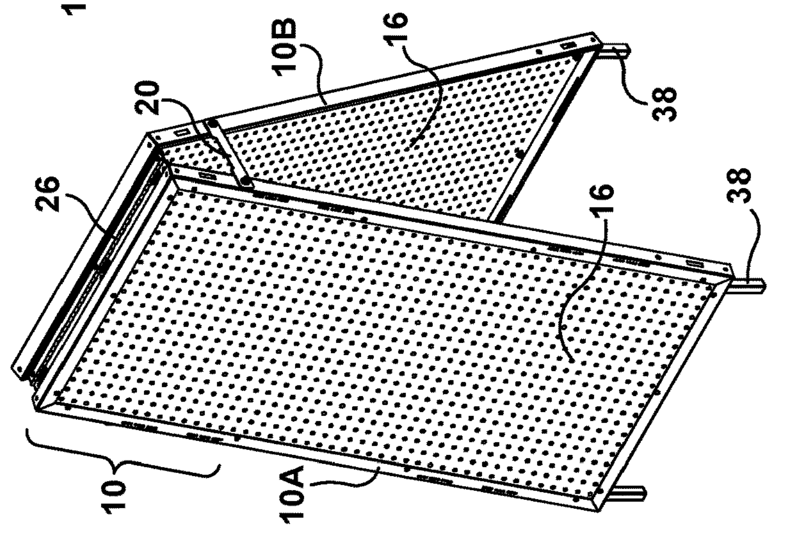
FIG. 6 is a perspective view of two attached main frames.
Figure 12:
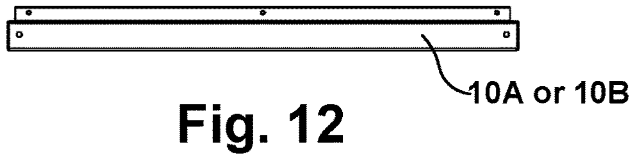
FIG. 12 is a top-down view of FIG. 11.
Figure 11:
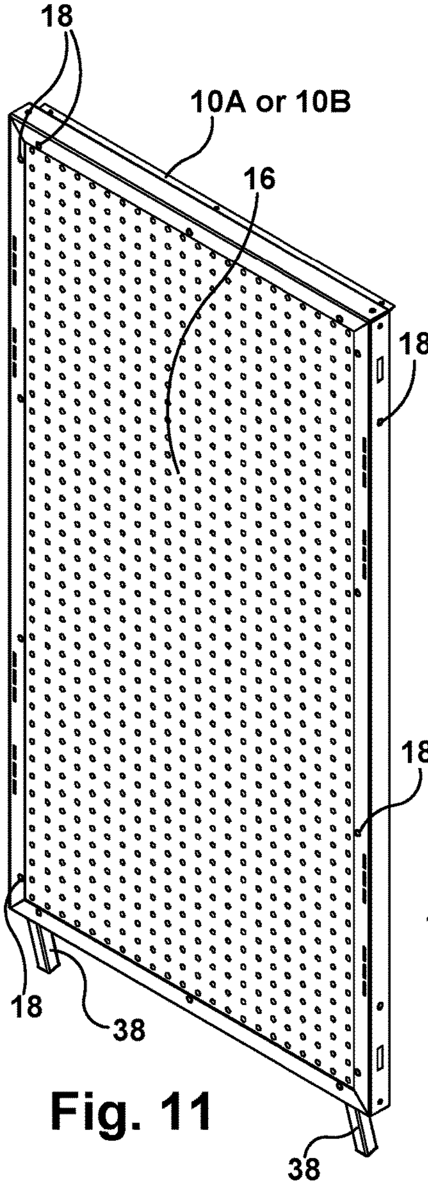
FIG. 11 is a perspective view of a single main frame.
Figure 13:
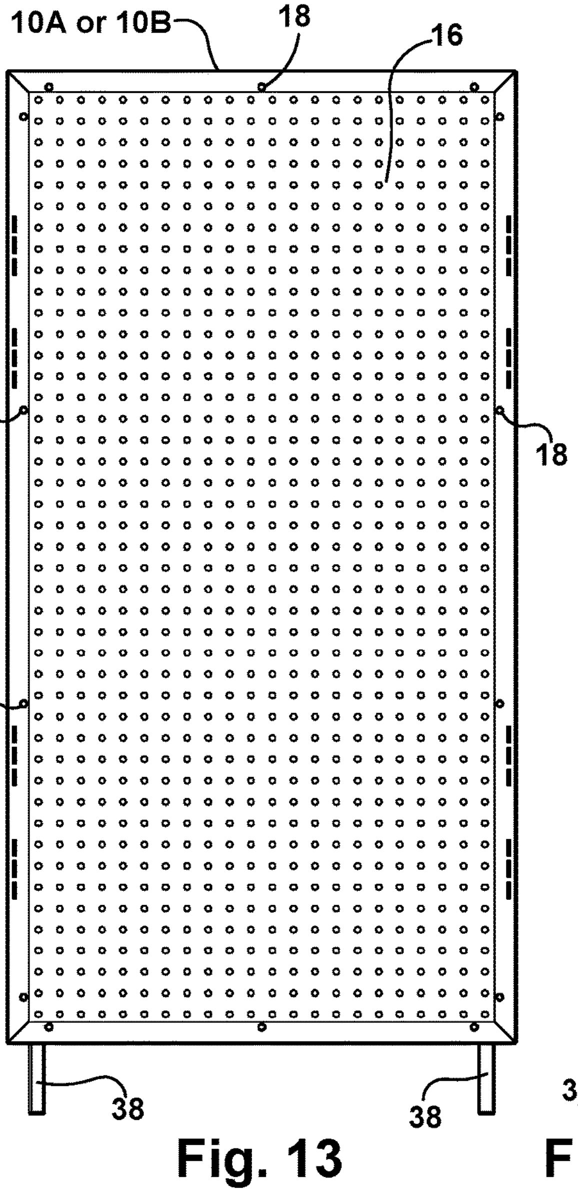
FIG. 13 is a front view of FIG. 11.
Figure 14:
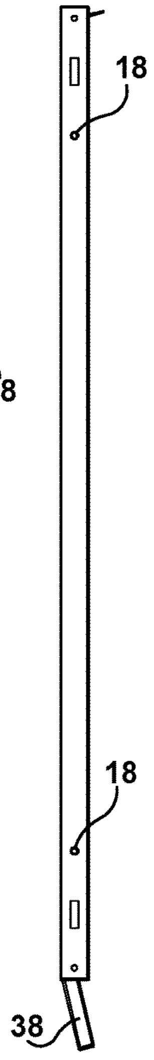
FIG. 14 is a right side view of FIG. 11.
Figure 16:
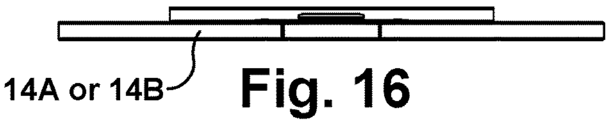
FIG. 16 is a top-down view of FIG. 15.

The main frame assembly 10 of the a-frame display 100 includes two (2) main frames 10A, 10B, each with a pegboard panel insert 16, and a frame lock 20. Each of the two (2) main frames 10A, 10B contain two short sides—a first side and a second side and two long sides—a third side and a fourth side, which extend between and are perpendicular to the two short sides to create a rectangular outer frame, as shown in FIGS. 11 and 13. Each of the four sides of each main frame 10A, 10B have a first end and a second end opposite the first end. A pegboard panel 16 is inserted and attached between the four sides of the main frames 10A, 10B. The two (2) main frames 10A, 10B are connected together proximate their upper edges, as shown in FIGS. 5, 6, 9 and 10. Each main frame 10A, 10B contains pre-drilled holes 18 which facilitate attachment of the other components of the merchandise assembly 100. A frame lock 20 is inserted between the two main frames 10A, 10B to removably attach them together at an angle to form the a-frame, as shown in FIGS. 6 and 9. The frame lock 20 contains a pre-drilled hole 22 at one end thereof and a notch 24 at the opposite end, as shown in FIGS. 9 and 10. The pre-drilled hole 22 on the frame lock 20 is aligned with a pre-drilled hole 18 proximate the first end of a long side of one of the main frames 10B and attached together via screw and nut (see FIG. 10). This allows the frame lock 20 to pivot about the attachment point. A screw is attached to a pre-drilled hole 18 proximate the first end of a long side of the other main frame 10A and held in place with a nut. To secure or lock the two main frames 10A, 10B together, the notch end 24 of the frame lock 20 attaches over the screw located proximate the first end of a long side of the main frame 10A (see FIG. 10). A frame lock 20 is also attached to the opposite side of the two main frames 10A, 10B in the manner described above. In an example shown in the figures, the two attached main frames 10A, 10B are approximately 25-inches apart at the furthest point.

A sign holder 26 may be attached between the two main frames 10A, 10B at the upper edge thereof, above the frame lock 20, via a piano hinge and two pop rivets. Signage 28 may be easily inserted and removed therefrom, as shown in FIG. 5.

A bottom pan 12 may be inserted between the two attached main frames 10A, 10B at a lower edge thereof to create a floor onto which product or other display attachments may be retained.

Figure 23:
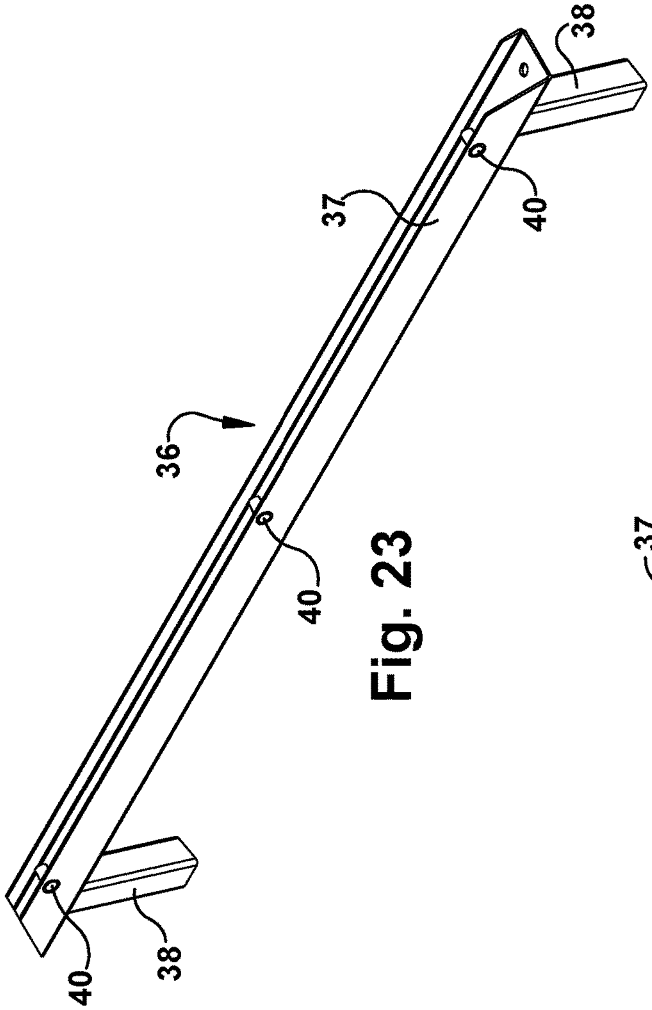
FIG. 23 is a perspective view of a bottom channel.
Figure 24:
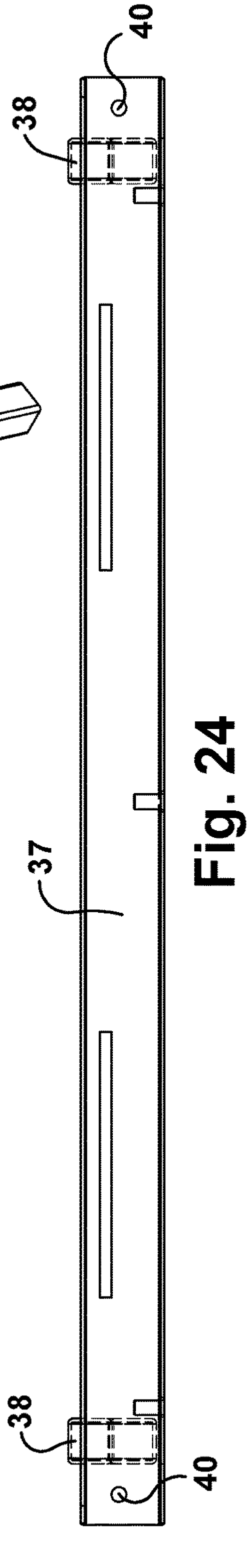
FIG. 24 is a top-down view of FIG. 23.
Figure 25:
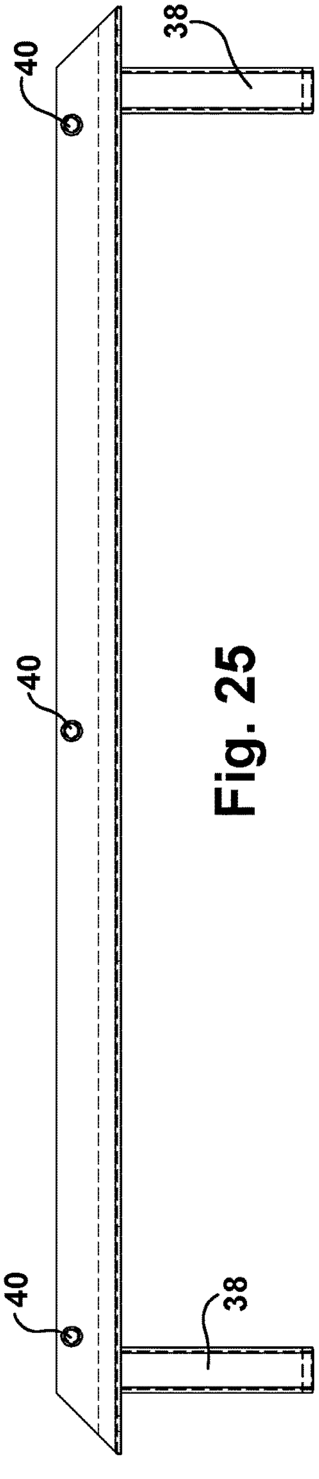
FIG. 25 is a front view of FIG. 23.
Figure 26:
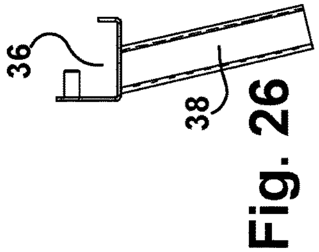
FIG. 26 is a right-side view of FIG. 23.

A bottom channel 36 may be attached to the bottom surface of each of the two main frames 10A, 10B. The bottom channel 36 contains an upward facing u-shaped channel 37 with two tube legs 38 extending downward from opposing edges therefrom, as shown in FIG. 23. The bottom channel 36 contains a plurality of pre-drilled holes 40 which align with the pre-drilled holes 18 on the two main frames 10A, 10B to facilitate attachment thereto. The tube legs 38 keep the merchandise display assembly 100 from sitting directly on the surface upon which it placed.

Figure 15:
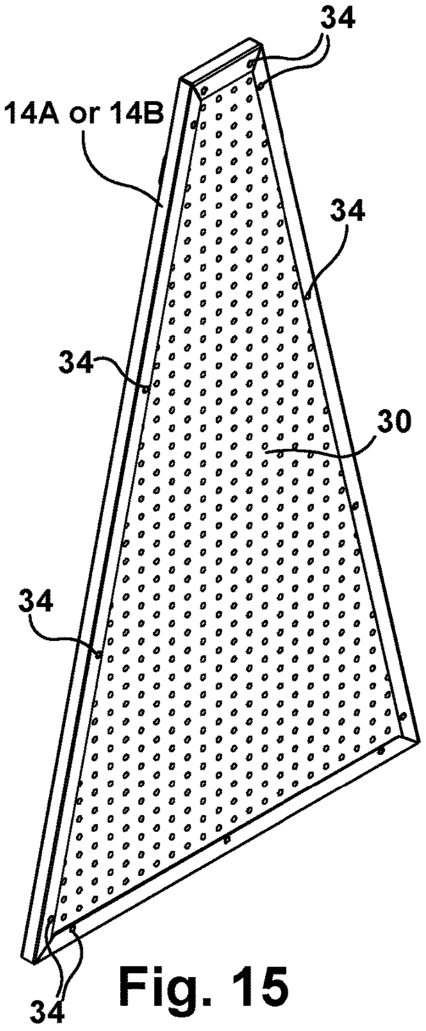
FIG. 15 is a perspective view of a single side frame.
Figure 17:
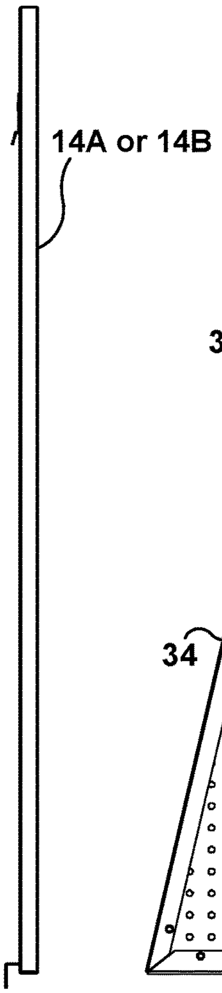
FIG. 17 is a right-side view of FIG. 15.
Figure 18:
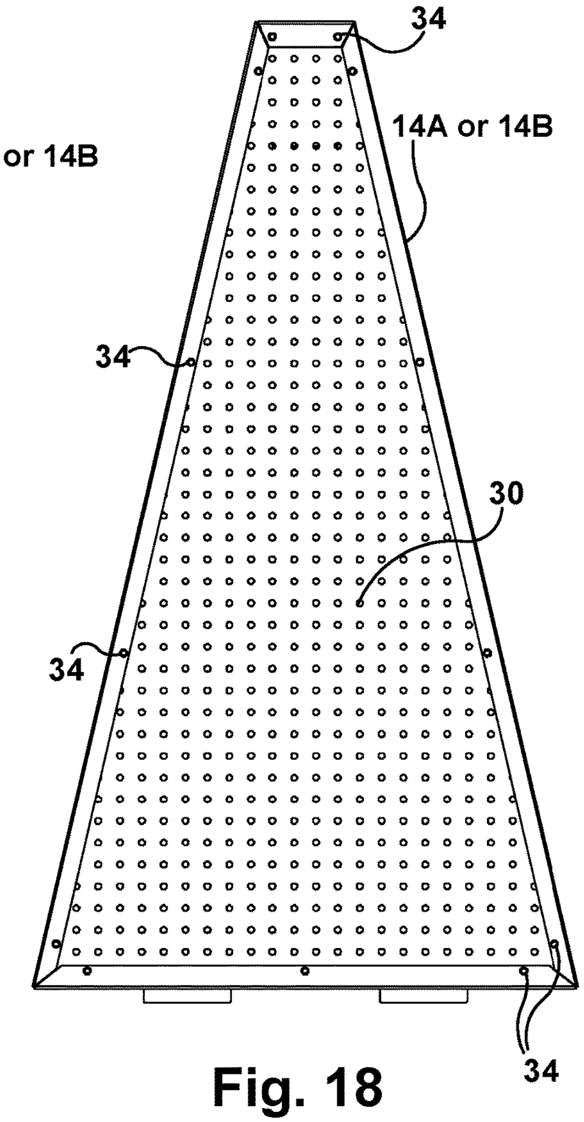
FIG. 18 is a front view of FIG. 15.
Figure 19:
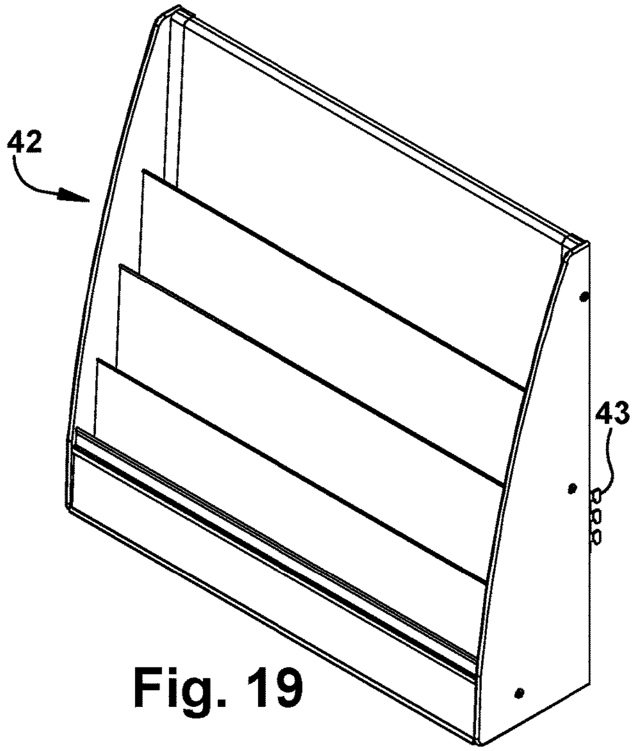
FIG. 19 is a perspective view of a merchandise assembly or 4-row greeting card tier.
Figure 20:
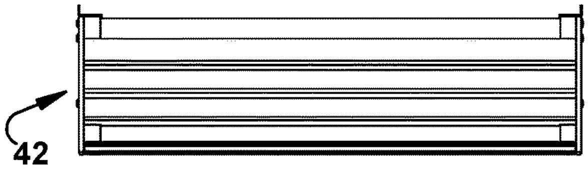
FIG. 20 is a top-down view of FIG. 19.
Figure 21:
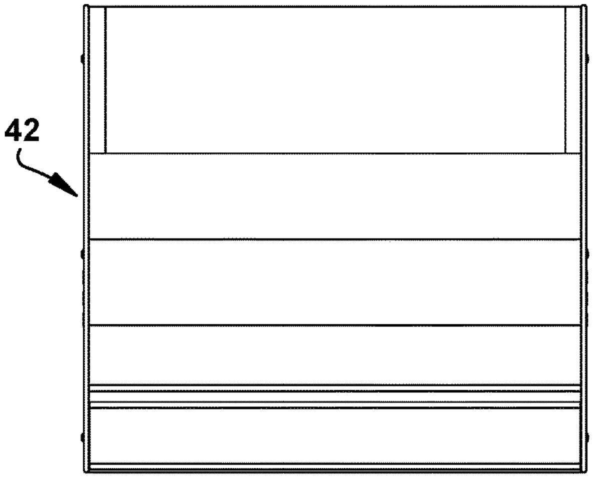
FIG. 21 is a front view of FIG. 19.
Figure 22:
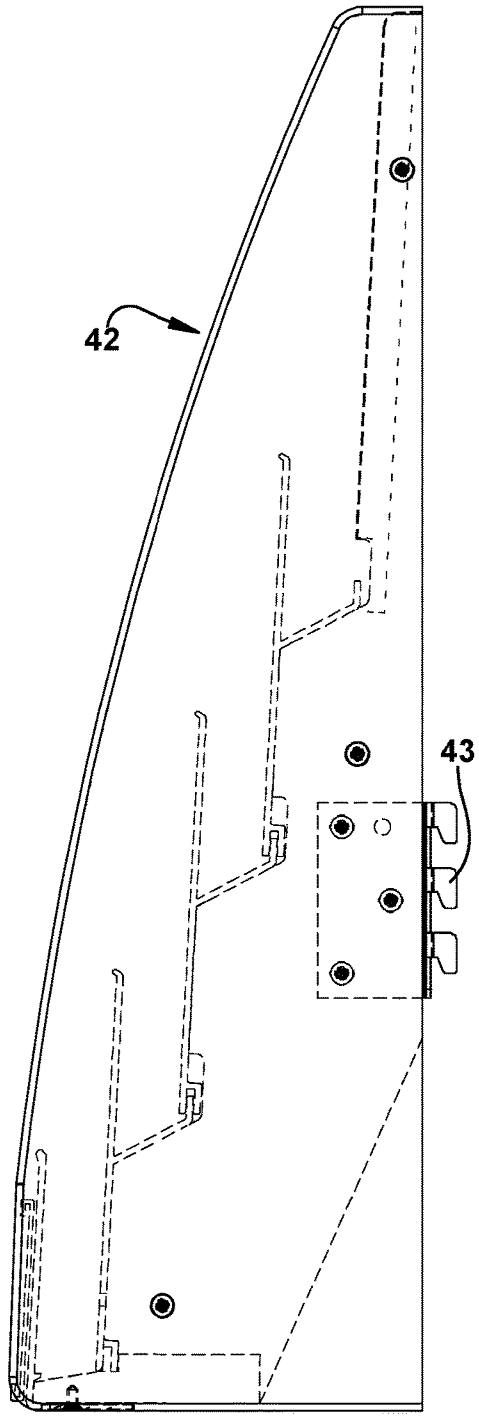
FIG. 22 is a right-side view of FIG. 19.

A side frame assembly 14, contains two (2) side frames 14A, 14B with pegboard panels inserted therebetween. When the side frame assembly 14 is attached to the main frame assembly 10 it creates a substantially closed 4-sided structure. Each of the two (2) side frames 14A, 14B are somewhat triangular shaped with two (2) angled sides, one (1) long horizontal side extending between the two (2) angled sides and one (1) top horizontal side extending between the two angled sides, as shown in FIGS. 15 and 18. A pegboard panel 30 is inserted between the sides of the two (2) side frames 14A, 14B. Each of four (4) sides of the two (2) side frames 14A, 14B also contain a plurality of pre-drilled holes 34. These pre-drilled holes 34 align with the plurality of pre-drilled holes 18 on the two (2) main frames 10A, 10B to facilitate attachment thereto.

Merchandise assemblies can easily be added and removed from the a-frame structure. It creates a flexible fixture wherein different merchandise assemblies may be interchanged depending on need. Each merchandise assembly may be added, removed, or re-arranged without disruption of other merchandise assemblies that may also be attached to the fixture. In one example, as shown in the figures, a merchandise assembly may be a four (4) row card tier 42. The card tier 42 contains hardware 43 attached to the rear surface thereof which facilitates attachment to and removal of the card tier 42 from the pegboard panel 16 on the two (2) main frames 10A, 10B. Each card tier 42 may contain a plurality of greeting cards or other similar product. Other types of merchandise assemblies may be attached to the display 100 to maximize the amount of product on the display 100 or to maximize the number of different products on the display 100. In the configuration shown in the figures, two (2) merchandise assemblies (4-row card tiers) can be placed vertically onto each of the two (2) main pegboard panels 16, allowing four (4) merchandise assemblies per a-frame display 100. Other product may be displayed on the side panels 30A, 30B of the display 100. For example, peg board hooks 44 can be used to display hanging merchandise, such as, for example, gift bags, tissue paper, etc.

While the a-frame display of the present disclosure and related inventions is described herein and shown in the figures to have particular shapes and dimensions, other frame and panel shapes with other dimensions are considered to be within the scope of the present invention. Also, while the use of pegboard panels is described herein and shown in the figures, other types of panels may be used.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

The invention claimed is:

1. An A-frame merchandise display comprising:

a first main frame and a second main frame, each of the first and second main frames having a first vertically oriented edge opposite from and parallel to a second vertically oriented edge and a first horizontally oriented edge opposite from and parallel to a second horizontally oriented edge;

an interchangeable panel inserted into each of the first and second main frames between the first and second vertically oriented edges and the first and second horizontally oriented edges;

a first frame lock and a second frame lock, each frame lock having a first end and a second end;

the first end of the first frame lock being attached to the first vertically oriented edge of the first main frame and the first end of the second frame lock being attached to the second vertically oriented edge of the first main frame;

the second end of the first frame lock being removably attached to the first vertically oriented edge of the second main frame and the second end of the second frame lock being removably attached to the second vertically oriented edge of the second main frame;

two side frames, each of the two side frames having a short horizontal edge and a long horizontal edge opposite the short horizontal edge and a first vertically angled edge and a second vertically angled edge opposite the first vertically angled edge;

the two side frames being attached between the first and second main panels, creating a substantially closed angular display; and a pegboard panel attached between the short and long horizontal edges and the first and second vertically angled panels of the two side frames;

wherein the first and second frame locks retain the first and second main frames in a position in which they are spaced apart and form an acute angle.

2. The A-frame merchandise assembly of claim 1, wherein the two main frames are rectangular.

3. The A-frame merchandise assembly of claim 1, wherein the interchangeable panel is a card tier.

4. The A-frame merchandise assembly of claim 1, further comprising a sign holder attached to an upper edge of the first and second main frames.

5. The A-frame merchandise assembly of claim 1, further comprising a pan or tray attached to a bottom surface of the first and second main frames and the two side frames.

6. The A-frame merchandise assembly of claim 1, further comprising a bottom channel having two legs located at opposing ends thereof, the bottom channel being connected to the bottom-most horizontal edge of the first and second main panels.

7. The A-frame merchandise assembly of claim 1, wherein the interchangeable panel is pegboard.

* * * * *